United States Patent
Mehrotra et al.

(10) Patent No.: US 12,528,484 B2
(45) Date of Patent: Jan. 20, 2026

(54) SYSTEMS AND METHODS FOR DETERMINING TRUST ACROSS MOBILITY PLATFORMS

(71) Applicant: Honda Motor Co., Ltd., Tokyo (JP)

(72) Inventors: Shashank Kumar Mehrotra, Campbell, CA (US); Kumar Akash, Milpitas, CA (US); Zhaobo K. Zheng, San Jose, CA (US); Teruhisa Misu, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 18/178,183

(22) Filed: Mar. 3, 2023

(65) Prior Publication Data

US 2024/0294180 A1    Sep. 5, 2024

(51) Int. Cl.
*B60W 50/08* (2020.01)
*B60W 50/00* (2006.01)

(52) U.S. Cl.
CPC ..... *B60W 50/08* (2013.01); *B60W 2050/0043* (2013.01); *B60W 2050/0095* (2013.01); *B60W 2530/13* (2021.08)

(58) Field of Classification Search
CPC ......... B60W 50/08; B60W 2050/0043; B60W 2050/0095; B60W 2530/13
USPC ......................................................... 701/36
See application file for complete search history.

(56) References Cited

U.S. PATENT DOCUMENTS

| | | | |
|---|---|---|---|
| 9,904,287 B1 | 2/2018 | Kuffner et al. | |
| 11,332,165 B2 | 5/2022 | Akash et al. | |
| 11,498,591 B2 | 11/2022 | Akash et al. | |
| 2017/0327082 A1 | 11/2017 | Kamhi et al. | |
| 2017/0343375 A1 | 11/2017 | Kamhi et al. | |
| 2017/0352267 A1 | 12/2017 | Tzirkel-Hancock et al. | |
| 2021/0034059 A1* | 2/2021 | Nagata | G05D 1/0285 |
| 2022/0147535 A1* | 5/2022 | Frank | G06Q 30/0203 |
| 2022/0324490 A1 | 10/2022 | Akash et al. | |
| 2022/0388543 A1* | 12/2022 | David | B60W 30/18163 |
| 2024/0199042 A1* | 6/2024 | Stenneth | B60W 10/04 |

* cited by examiner

*Primary Examiner* — Tiffany P Young
*Assistant Examiner* — Ashleigh Nicole Turnbaugh
(74) *Attorney, Agent, or Firm* — Rankin, Hill & Clark LLP

(57) ABSTRACT

Systems and methods for determining trust across mobility platforms are provided. In one embodiment, a method includes receiving first mobility data for a first automation experience of a user with a first mobility platform. The method also includes receiving a swap indication for a second automation experience of the user with a second mobility platform after the first automation experience. The method further includes selectively assigning the first mobility platform to a first mobility category and the second mobility platform to a second mobility category different than the first mobility category. The method yet further includes calculating an estimated trust score for the second automation experience by applying a trust model based on the first mobility category, the second mobility category, and a sequence of the first automation experience and the second automation experience. The method includes modifying operation of the second mobility platform based on the estimated trust score.

20 Claims, 8 Drawing Sheets

SYSTEMS AND METHODS FOR DETERMINING TRUST ACROSS MOBILITY PLATFORMS

BACKGROUND

Individuals are increasingly becoming dependent on automated systems in vehicles ranging from advanced driver-assistance systems (ADAS) like adaptive cruise control and object avoidance to self-driving automation. Even with significant growth in technological capabilities, human supervision and intervention may still play a role in these operations. Researchers have shown that human trust plays a role in these interactions between human and automated systems. On one hand, low levels of trust may lead to disuse of automation thereby losing the benefits of the automation. On the other hand, over-trust may lead to a human disengaging fully from the driving process.

Trust calibration may increase the likelihood of a successful interaction between humans and automation. Human trust plays a fundamental role in a human's interactions with automated systems. However, human trust is an abstract, multidisciplinary concept, with individual disciplines characterizing a different relationship as "trust." Therefore, quantifying and predicting trust is a challenging task given that it's meaning changes across contexts as well as between different mobility platforms.

BRIEF DESCRIPTION

According to one aspect, a computer-implemented method for determining trust across mobility platforms is provided. The computer-implemented method includes receiving first mobility data for a first automation experience of a user with a first mobility platform. The computer-implemented method also includes receiving a swap indication for a second automation experience of the user with a second mobility platform after the first automation experience. The computer-implemented method further includes selectively assigning the first mobility platform to a first mobility category and the second mobility platform to a second mobility category different than the first mobility category. The computer-implemented method yet further includes calculating an estimated trust score for the second automation experience by applying a trust model based on the first mobility category, the second mobility category, and a sequence of the first automation experience and the second automation experience. The computer-implemented method includes modifying operation of the second mobility platform based on the estimated trust score.

According to another aspect, a system for determining trust across mobility platforms is provided. The system includes a memory storing instructions that when executed by a processor cause the processor to receive first mobility data for a first automation experience of a user with a first mobility platform. The instructions also cause the processor to receive a swap indication for a second automation experience of the user with a second mobility platform after the first automation experience. The instructions further cause the processor to selectively assign the first mobility platform to a first mobility category and the second mobility platform to a second mobility category different than the first mobility category. The instructions yet further cause the processor to calculate an estimated trust score for the second automation experience by applying a trust model based on the first mobility category, the second mobility category, and a sequence of the first automation experience and the second automation experience. The instructions cause the processor to modify operation of the second mobility platform based on the estimated trust score.

According to yet another aspect, a non-transitory computer readable storage medium storing instructions that when executed by a computer, which includes a processor, perform a method for determining trust across mobility platforms is provided. The method includes receiving first mobility data for a first automation experience of a user with a first mobility platform. The method also includes receiving a swap indication for a second automation experience of the user with a second mobility platform after the first automation experience. The method further includes selectively assigning the first mobility platform to a first mobility category and the second mobility platform to a second mobility category different than the first mobility category. The method yet further includes calculating an estimated trust score for the second automation experience by applying a trust model based on the first mobility category, the second mobility category, and a sequence of the first automation experience and the second automation experience. The method includes modifying operation of the second mobility platform based on the estimated trust score.

DETAILED DESCRIPTION

Figure 1:
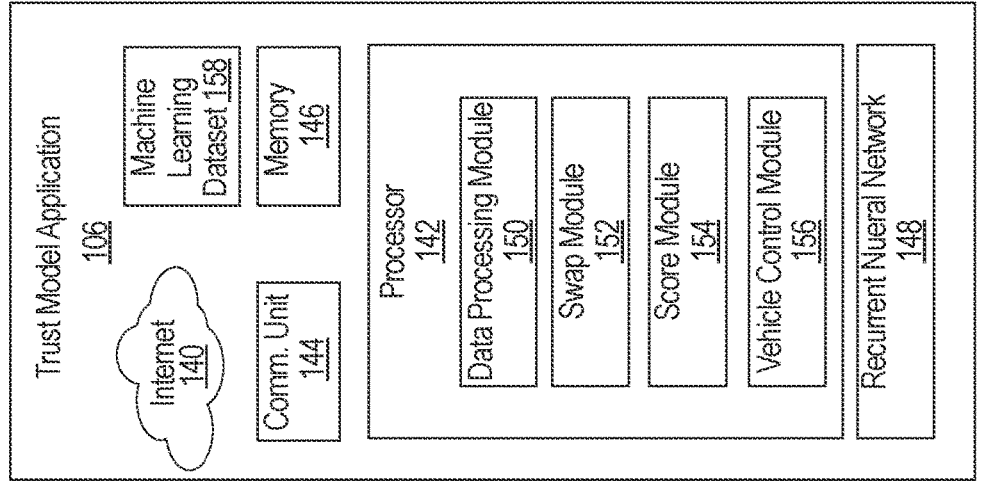
FIG. 1 is a schematic view of an exemplary operating environment for implementing systems and methods for determining trust across mobility platforms according to an exemplary embodiment.
Figure 1:
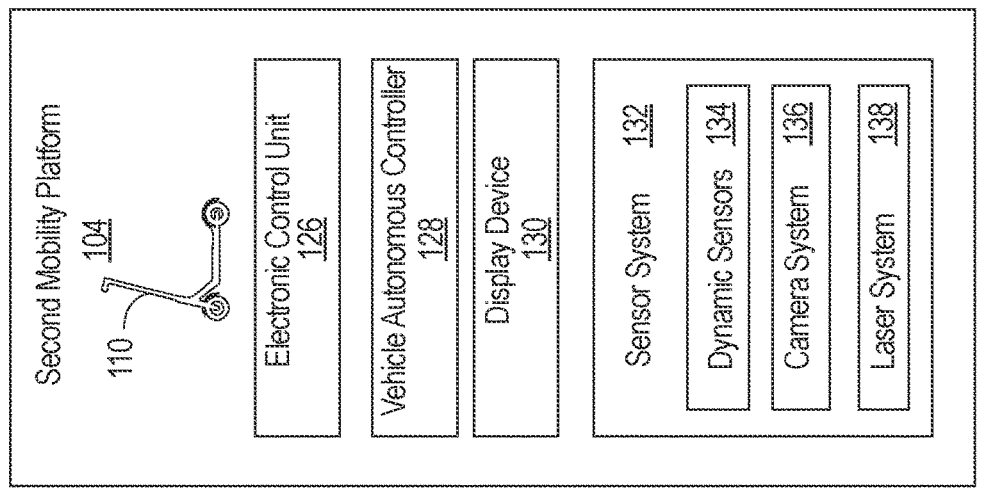
Figure 1:
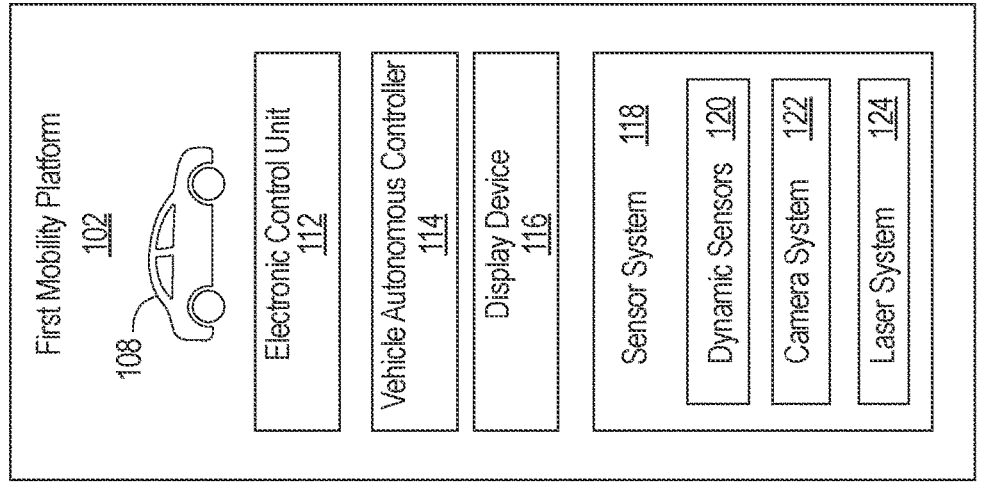

The ever-increasing adoption of different mobility platforms has the potential to fundamentally change the preferences and usage of these mobility platforms. A mobility platform is an interface of a motorized device that may be partially or wholly operated autonomously. Mobility platforms may be categorized based on the type of motorized device. For example, a first mobility category may be vehicular and include mobility platforms for automation of automobiles. A second mobility category may be for electronic scooters. Transitioning between different categories of mobility platforms raises several challenges with respect to the design and development of mobility platforms that may enable a large population to take advantage of this emergent technology.

One such challenge is the lack of understanding of how trust in one automated mobility may impact trust in another. Without this understanding, it is difficult for researchers to determine whether future mobility solutions will have acceptance within different population groups. By modeling the differences in trust across different mobility platforms and how trust evolves across their use. Accordingly, an estimated trust score may be calculated from one mobility platform to another by applying the trust model based on the first mobility category, the second mobility category, and a sequence of the first automation experience and the second automation experience. For example, the trust model may increase the estimated trust score when a user transitions from a first mobility platform of the vehicular mobility category to a second mobility platform of the scooter mobility category. In comparison, the trust model may decrease the estimated trust score when a user transitions from, in this example, the second mobility platform to the first mobility platform.

When a different mobility platform is about to be experienced by the user, the estimated trust score may be calculated using the trust model based on the mobility platforms as well as the sequence in which the mobility platforms are to be experienced. In this manner, the trust model may be used to inform and identify how people may develop trust in future mobility platforms and could inform the design of interventions. For example, the operation of the second mobility platform to be encountered by the user may be modified to increase or decrease automation aids (e.g., tutorials, automation transparency, etc.) or alter the behavior of the motorized device (e.g., driving style, proactive planning, etc.). Thus, the systems and methods described herein that help improve the trust and acceptance of future mobility platforms.

DEFINITIONS

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

I. System Overview

Referring now to the drawings, the showings are for purposes of illustrating one or more exemplary embodiments and not for purposes of limiting same. FIG. 1 is a schematic view of an exemplary operating environment 100 for implementing systems and methods for determining trust across mobility platforms according to an exemplary embodiment of the present disclosure. The components of the environment 100, as well as the components of other systems, hardware architectures, and software architectures discussed herein, may be combined, omitted, or organized into different architectures for various embodiments.

Generally, the environment 100 includes a first mobility platform 102, a second mobility platform 104, and a trust model application 106. The first mobility platform 102 is associated with a first motorized device 108 and the second mobility platform 104 is associated with a second motorized device 110. The first mobility platform 102 and the second mobility platform 104 are associated with similar components. For example, the first mobility platform 102 includes an electronic control unit (ECU) 112 that executes one or more applications, operating systems, vehicle system and subsystem user interfaces, among others. The ECU 112 may also execute the trust model application 106. The trust model application 106 may be configured to utilize a recurrent neural network (RNN) 148 to model and calculate one or more trust scores of a user (not shown) of the first motorized device 108 and/or the second motorized device 110 in one or more automation experiences. As discussed in more detail below, the trust model application 106 is configured to provide an RNN based human trust model that captures trust dynamics with respect to an autonomous operation or semi-autonomous operation of the first motorized device 108 and/or the second motorized device 110 in one or more automation experiences.

An automation experience is an interaction between a user and a mobility platform via a motorized device. For example, the automation experience for the first mobility platform 102 may be determined on the dynamic data associated with the operation of the first motorized device 108. For example, the automation experience may begin at ignition of first motorized device 108 and end at shut-down of first motorized device 108 associated with the first mobility platform 102. In another example, the dynamic data may be analyzed to for a predetermined period of time to determine operation of a first motorized device. The dynamic data may also be analyzed to determine a type of take-over control the user of the motorized device is completing with respect to the autonomous or semi-autonomous operation of the motorized device at particular time stamps. In another embodiment, the dynamic may be processed in real-time.

The automation experience may be defined as a traffic scenario that pertains to, one or more traffic maneuvers of the first motorized device 108 and/or the second motorized device 110 and one or more traffic configurations of the driving scene. The one or more traffic maneuvers of the first motorized device 108 and/or the second motorized device 110 may include, but may not be limited to, a merging scenario, an acceleration scenario, a braking scenario, a turning scenario, and the like. The one or more traffic configurations of the driving scene may include, but not limited to, a number of lanes of a roadway, a type of roadway intersection, one or more static objects that may be located within the driving scene, one or more dynamic objects that may be located within the driving scene of the first motorized device 108 and/or the second motorized device 110, and the like.

As discussed below, the trust model application 106 may be configured to utilize various inputs that are related to effects of automation variables and scene variables in particular traffic scenarios to define the automation experience. Such inputs maybe provided by systems, sensors, and/or components of the first motorized device 108 and/or the second motorized device 110 and/or may be provided in the form of pre-trained crowdsourced survey data that may be provided by participants based on driving simulations that may be completed by the individuals and/or previous autonomous operation of the first motorized device 108 and/or the second motorized device 110 and/or experiences with the first mobility platform 102 and/or the second mobility platform 104.

The trust model application 106 may accordingly provide a trust modeling framework that is configured to utilize the RNN 148 to calculate a trust score for a user to the automated or semi-automated operation of the first motorized device 108 and/or the second motorized device 110 based on mobility platforms encountered by the user and the sequence in which the mobility platforms are encountered. The trust modeling framework provided by the trust model application 106 may provide an understanding of the user's trust in a real-time autonomous or semi-autonomous driving situation. Additionally, the estimated trust score may indicate how a user's trust changes as the user experiences different mobility platforms, such as the first mobility platform 102 and/or the second mobility platform 104.

The trust model application 106 may provide an improvement to a computer and technology with respect to prediction of a user's trust using automated driving systems using scene-dependent variables, automation-dependent variables, and user-dependent variables by modeling effects of these variables for multiple mobility platforms such as the first mobility platform 102 and the second mobility platform 104. This improvement may allow for selective utilization of automation aids based on the types and sequence of encountered mobility platforms and the corresponding motorized devices.

Figure 2:
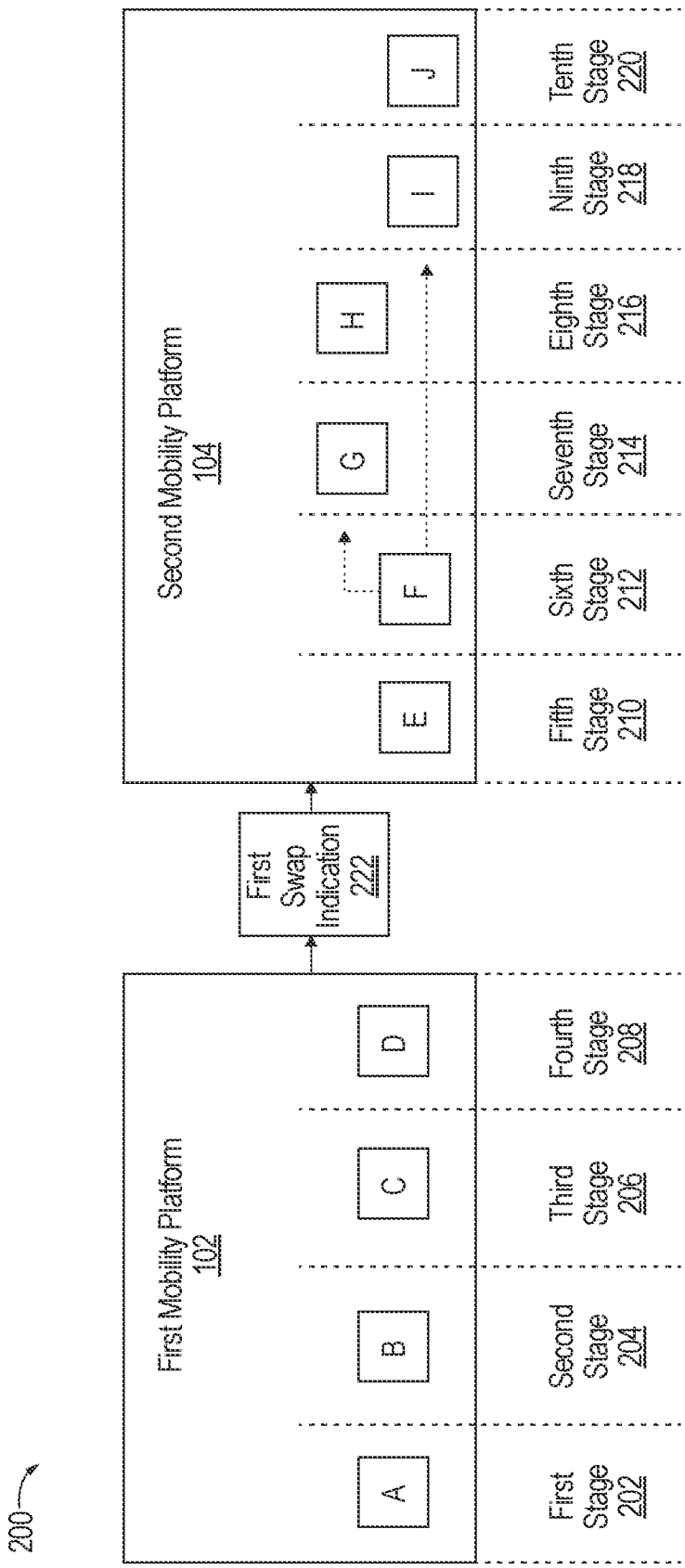
FIG. 2 is an exemplary schematic general overview of a first sequence for trust model according to an exemplary embodiment.
Figure 3:
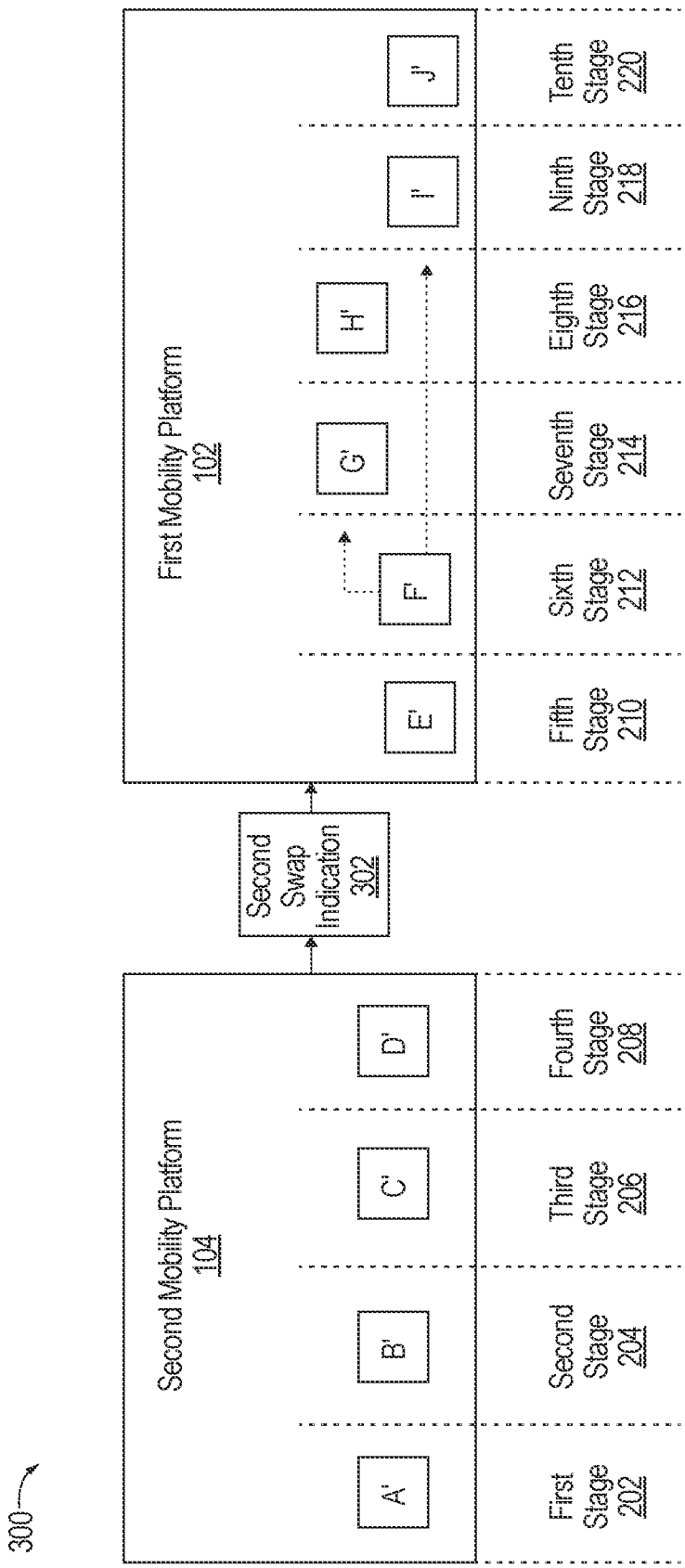
FIG. 3 is an exemplary schematic general overview of a second sequence for the trust model according to an exemplary embodiment.

The modeling of the trust model application 106 is based on a sequence of the first automation experience and the second automation experience. For example, a first sequence 200, shown in FIG. 2, illustrates the first mobility platform 102 being followed by the second mobility platform 104. A second sequence 300, shown in FIG. 3, illustrates the second mobility platform 104 being followed by the first mobility platform 102. The sequences taken together form the basis of the trust model 400, shown in FIG. 4, which begins with an initial mobility platform 402 followed by a subsequent mobility platform 404. In particular, trust points may be determined for each stage of the first sequence 200 and the second sequence 300. The trust model 400 calculates trust scores based on the trust points calculated at various stages of use of the initial mobility platform 402 and the subsequent mobility platform 404.

While two mobility platforms are described, it will be understood that more mobility platforms may be included in the trust model 400 by including additional sequences that include different ordered encounters with the mobility platform. For example, should a third mobility platform (not shown) be included, additional sequences may be added to the trust model 400. The additional sequences may include two of three mobility platforms. For example, a sequence may include the first mobility platform 102 as the initial mobility platform 402 to third mobility platform as the subsequent mobility platform 404. The trust model 400 may include any variations of the order of mobility platforms. Continuing the example, sequences may also include the third mobility platform to the first mobility platform 102, the second mobility platform 104 to the third mobility platform, and the third mobility platform to the second mobility platform 104. Additionally, the sequences may include more than two mobility platforms. For example, a sequence may include the first mobility platform 102 to the second mobility platform 104 and then to the third mobility platform. Furthermore, a sequence may include the third mobility platform, to the second mobility platform, and then to the first mobility platform 102, and so on. Thus, the number of sequences may be based on the number of ordered iterations of the mobility platforms.

In the first sequence 200, the first mobility platform 102 is encountered at a first time and is either followed or will be followed by the second mobility platform 104 at a second time after the first time. In one embodiment, the first sequence 200, shown in FIG. 2, includes ten stages 202-220 including a first stage 202, a second stage 204, a third stage 206, a fourth stage 208, a fifth stage 210, a sixth stage 212, a seventh stage 214, an eighth stage 216, a ninth stage 218, and a tenth stage 220. The stages 202-220 correspond to events associated with the first mobility platform 102 and the second mobility platform 104.

The stages 202-220 may be determined based on different user's encounters with a mobility platform, such as an initial interaction, ignition, tutorials, and different driving scenarios, among others. In one embodiment, the stages 202-220 may be indicative of time points when a user or participant's trust is measures. A user may be a person experiencing a mobility platform for the user's own purposes, whereas a participant may have experienced the mobility platform with purpose of providing feedback regarding the mobility platform. For example, the feedback may include crowd sourced survey data from a number of participants. As will be discussed in greater detail below with respect to FIG. 5, trust points may be calculated for one or more of the stages 202-220 that may be used to determine trust parameters 502-510.

In one embodiment, the initial mobility platform 402 is the first mobility platform 102 and includes stage 202-208 of the first sequence 200. The first stage 202 may be indicative of engagement of a user with the first mobility platform 102. The second stage 204 may be indicative of a tutorial associated with the first mobility platform 102. The tutorial may be provided to a user to explain aspects of the first mobility platform 102. The third stage 206 may be indicative of a standard traffic scenario experienced with the first mobility platform 102. The standard traffic scenario may include less than a threshold number of decision point events. In some embodiments, the standard traffic scenario may be used to build trust with a participant after the tutorial.

The fourth stage 208 may be indicative of a proactive traffic scenario experienced with the first mobility platform 102. The proactive traffic scenario may include greater than a threshold number of decision point events. The decision point events may be based on a category of the mobility platform. For example, if the first mobility platform 102 of the first motorized device 108 is for an automobile, then the decision point events for the first mobility platform 102 may include a yellow light, left turn yield at a green light, jay walking pedestrians, crossing traffic lines, right turn merge, simultaneous arrival at an intersection, a vehicle backing out of a driveway, and passing a slow car, among others.

The first sequence 200 transitions from the first mobility platform 102 to the second mobility platform 104 in response to a first swap indication 222. The second mobility platform 104 includes stages 210-220 of the first sequence 200. The fifth stage 210 may be indicative of engagement of a user with the second mobility platform 104. The sixth stage 212 may be indicative of a tutorial associated with the second mobility platform 104. The tutorial may be provided to a user to explain aspects of the second mobility platform 104. The seventh stage 214 may be indicative of a standard traffic scenario experienced with the second mobility platform 104. The standard traffic scenario may include less than a threshold number of decision point events, again to build trust with a participant after the tutorial.

The eighth stage 216 may be indicative of a proactive traffic scenario experienced with the second mobility platform 104. The proactive traffic scenario may include greater than a threshold number of decision point events. If the second mobility platform 104 of the second motorized device 110 is for an electronic scooter to be operated on a sidewalk, then the decision point events for the second mobility platform 104 may include yielding to turning car, jaywalking pedestrians, crossing crosswalk lines, merging into a crowd of pedestrians, simultaneous arrival at an intersection, and passing slow pedestrians, among others.

The ninth stage 218 and the tenth stage 220 are an alternative to the seventh stage 214 and the eighth stage 216 and follow the sixth stage 212. The ninth stage 218 and the tenth stage 220 include proactive traffic scenarios experienced with the second mobility platform 104 and include greater than the threshold number of decision point events. Therefore, the stages 202-220 correspond to different events encountered while experiencing a transition from an initial mobility platform 402, here the first mobility platform 102, to a subsequent mobility platform 404, the second mobility platform 104.

The second sequence 300, shown in FIG. 3, is similar to the first sequence 200 and includes the same ten stages 202-220. However, here, in the second sequence 300, the second mobility platform 104 is encountered at the first time and is either followed or will be followed by the first mobility platform 102 at a second time after the first time. Similar to the first sequence 200, in the second sequence 300, the stages 202-220 correspond to different events encountered while experiencing a transition from an initial mobility platform 402, the second mobility platform 104, to a subsequent mobility platform 404, the first mobility platform 102 separated by the second swap indications 302.

Again, the first stage 202 may be indicative engagement of a user with the second mobility platform 104. The second stage 204 may be indicative of a tutorial associated with the second mobility platform 104. The tutorial may be provided to a user to explain aspects of the second mobility platform 104. The third stage 206 may be indicative of a standard traffic scenario experienced with the second mobility platform 104. The fourth stage 208 may be indicative of a proactive traffic scenario experienced with the second mobility platform 104. The proactive traffic scenario may include greater than a threshold number of decision point events.

The first mobility platform 102 includes stages 210-220 of the second sequence 300. The fifth stage 210 may be indicative engagement of a user with the first mobility platform 102. The sixth stage 212 may be indicative of a tutorial associated with the first mobility platform 102. The tutorial may be provided to a user to explain aspects of the first mobility platform 102. The seventh stage 214 may be indicative of a standard traffic scenario experienced with the first mobility platform 102. The standard traffic scenario may include less than a threshold number of decision point events, again to build trust with a participant after the tutorial. As above, the ninth stage 218 and the tenth stage 220 are an alternative to the seventh stage 214 and the eighth stage 216 and follow the sixth stage 212. The ninth stage 218 and the tenth stage 220 include proactive traffic scenarios experienced with the second mobility platform 104 and include greater than the threshold number of decision point events.

As discussed above, trust points are determined for each of the stages 202-220 for the sequences including the first sequence 200 and the second sequence 300. The trust points may be determined from remote data. For example, the trust points may be calculated from the crowdsourced survey data that may be provided by participants based on driving simulations that may be completed by the individuals and/or previous autonomous operation of the first motorized device 108 and/or the second motorized device 110. In another example, the trust points may be calculated from historical data from the user, the first motorized device 108, and/or the second motorized device 110.

A trust point is calculated for each stage as a value indicative of trust in the mobility platform at that stage. In one embodiment, the trust points may be calculated based on responses from participants by normalizing the survey responses for each individual participant. In one example, the responses may be normalized using z-normalization. For example, with regard to the first sequence 200, the trust point for the first stage 202 may be a value A, the trust point for the a second stage 204 may be a value B, the trust point for the a third stage 206 may be a value C, the trust point for the a fourth stage 208 may be a value D, the trust point for the a fifth stage 210 may be a value E, the trust point for the a sixth stage 212 may be a value F, the trust point for the a seventh stage 214 may be a value G, the trust point for the an eighth stage 216 may be a value H, the trust point for the a ninth stage 218 may be a value I, and the trust point for the a tenth stage 220 may be a value J.

With regard to the second sequence 300, the trust point for the first stage 202 may be a value A', the trust point for the a second stage 204 may be a value B', the trust point for the a third stage 206 may be a value C', the trust point for the a fourth stage 208 may be a value D', the trust point for the a fifth stage 210 may be a value E', the trust point for the a sixth stage 212 may be a value F', the trust point for the a seventh stage 214 may be a value G', the trust point for the an eighth stage 216 may be a value H', the trust point for the a ninth stage 218 may be a value I', and the trust point for the a tenth stage 220 may be a value J'.

Figure 4:
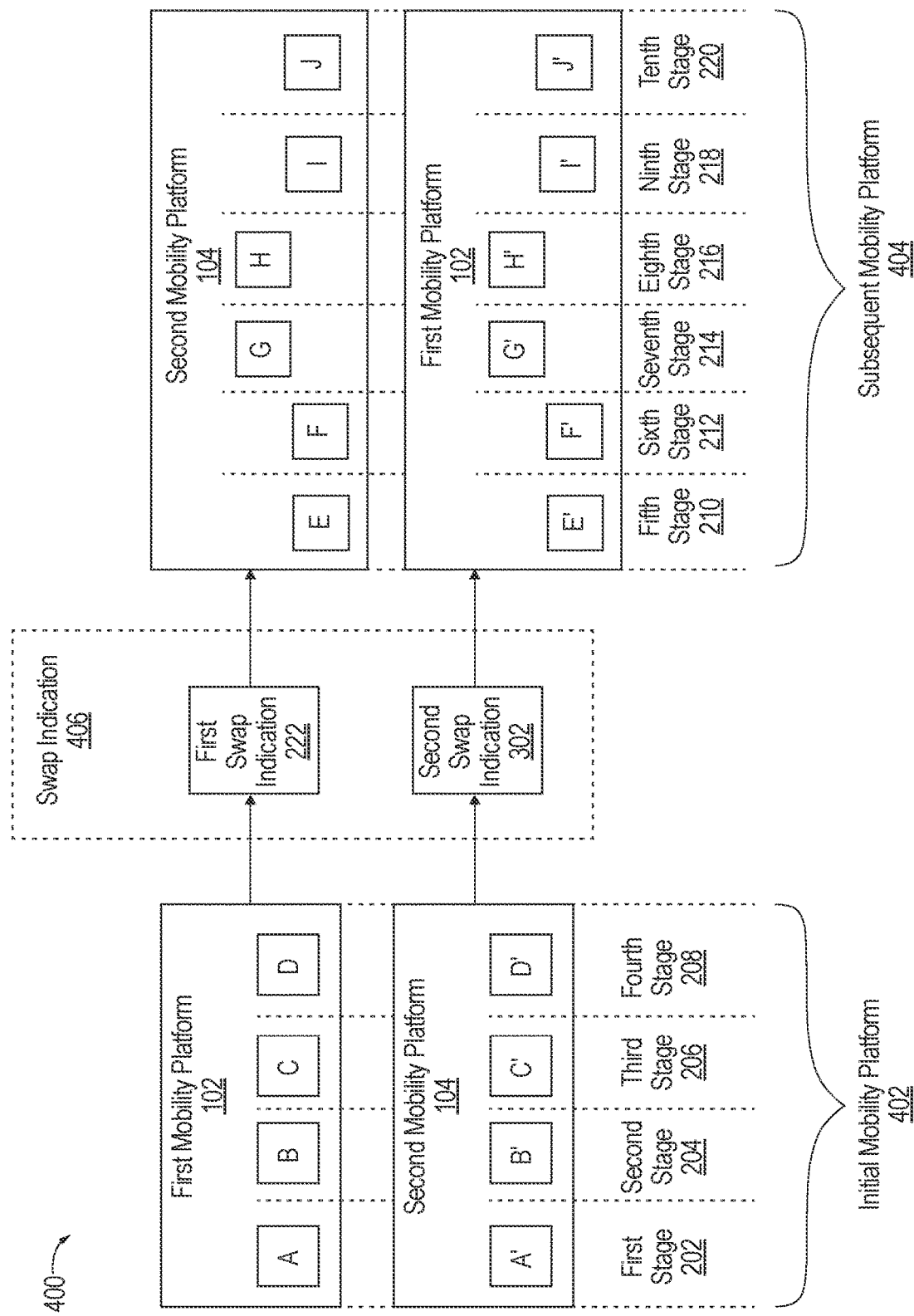
FIG. 4 is a schematic overview of the trust model for a trust model application according to an exemplary embodiment.

FIG. 4 is an exemplary schematic general overview of the trust model 400 provided by the trust model application 106 according to an exemplary embodiment. In an exemplary embodiment, the trust model 400 provided by the trust model application 106 may be determined based on the trust points regarding the semi-autonomous/autonomous operation of the first motorized device 108 and/or the second motorized device 110. The trust model 400 may receive inputs from one or more systems, sensors, and/or components of the first mobility platform 102 and the second mobility platform 104 and from crowdsourced survey data that may be completed by the individuals and/or past operation of the first mobility platform 102 and/or the second mobility platform 104.

Figure 5:
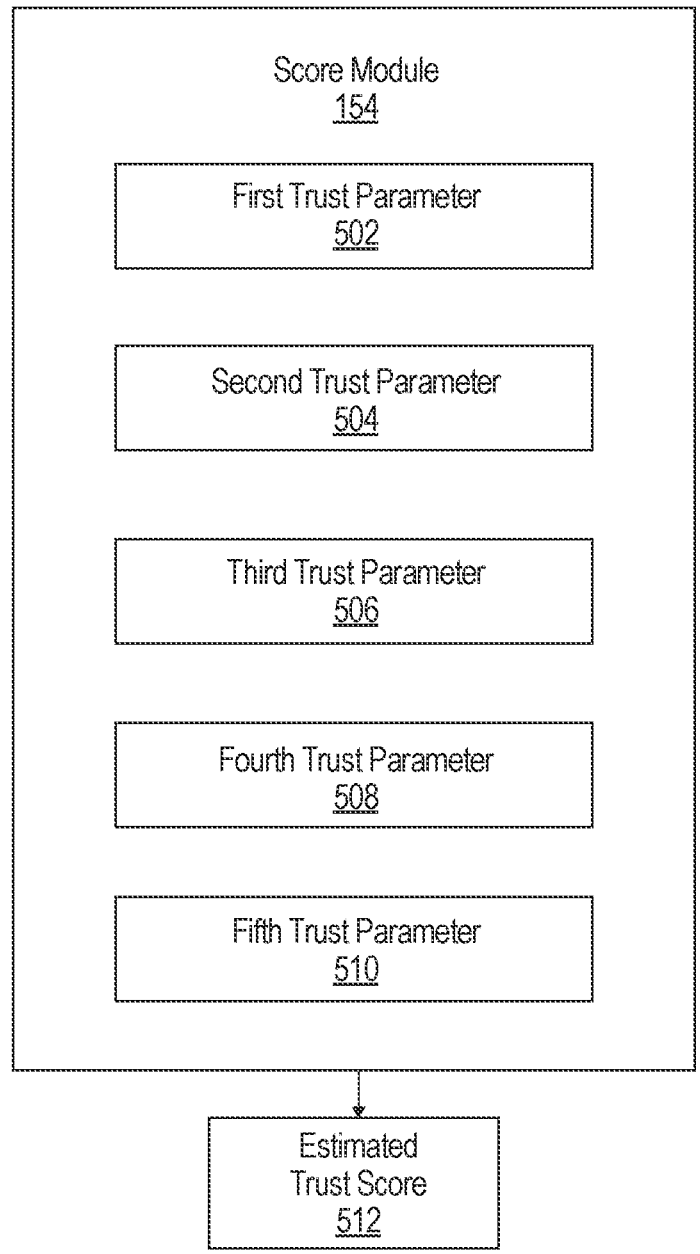
FIG. 5 is a process flow diagram of a method for determining trust across mobility platforms according to an exemplary embodiment.

The trust model 400 determines one or more trust parameters, shown in FIG. 5. The trust parameters may include a first trust parameter 502, a second trust parameter 504, a third trust parameter 506, a fourth trust parameter 508, and a fifth trust parameter 510. Trust parameters 502-510 differentiate different aspects of a user's or participant's trust in a mobility platform. For example, a user's or participant's trust may depend on their familiarity with a mobility platform, how reliable the mobile platform has been in the past, etc.

The trust parameters 502-510 are calculated for the sequences, such as the first sequence 200 and the second sequence 300 based on the trust points at specific stages. As one example, the trust parameters 502-510 may be based on a comparison of the trust points. In one embodiment, a pairwise t-test may be used to compare the responses from users and/or participant across the baseline encounter for groups of participants to generate the trust model 400.

The first trust parameter 502 may be indicative of reliability of the mobility platform. The first trust parameter 502 may determine reliability to determine the beliefs of the user that the corresponding motorized device is capable of interpreting situations correctly, works reliably, and does or does not make sporadic errors. In this manner, the first trust parameter 502 may determine a user's confidence in the capabilities of the corresponding motorized device for a mobility platform. The first trust parameter 502 may be calculated for the first sequence 200 based on a comparison of the trust point A of the first stage 202 to the trust point E of the fifth stage 210. Likewise, the first trust parameter 502 may be calculated for the second sequence 300 based on a comparison of the trust point A' of the first stage 202 to the trust point E' of the fifth stage 210.

By comparing the trust points from the first stage 202, of the first mobility platform 102, to the fifth stage 210, of the second mobility platform 104, in the first sequence 200, the trust model 400 may be used to determine the manner in which the first trust parameter 502 evolves when the user first encounters the first mobility platform 102 and then, at a later time, encounters the second mobility platform 104. The reverse is true such that the evolution of the first trust parameter 502 may be determined for the second mobility platform 104 to the first mobility platform 102, by comparing the points from the first stage 202 to the fifth stage 210 of the second sequence 300. Accordingly, the evolution of the first trust parameter 502 may be determined based on order of the initial mobility platform 402 and the subsequent mobility platform.

While calculating a trust parameter is described with respect to a single pair of trust points, the trust parameters 502-510 may be calculated on a number of pairs of trust points in each sequence. For example, the first trust parameter 502 is described as being calculated for the first sequence 200 based on a comparison of the trust point A to the trust point E. Additionally, the first trust parameter 502 may be calculated after a driving scenario by comparing the trust point C to the trust point G and/or the trust point C to the trust point I for the first sequence 200. In this manner, a plurality of trust point pairs may be used to calculate the trust parameters 502-510.

The trust parameters 502-510 may be used to model how trust changes across different mobility platforms. To compare the evolution of the first sequence 200 to the second sequence 300, the first trust parameter 502 may be calculated after a driving scenario by comparing the trust point C' to the trust point G' and/or the trust point C' to the trust point I' for the second sequence 300.

The second trust parameter 504 may be indicative of predictability of the mobility platform. The second trust parameter 504 may determine predictability to determine the belief of the user that the state of the corresponding motorized device is clear and acts predictably. The second trust parameter 504 may be calculated on the basis of a tutorial. For example, the second trust parameter 504 for the first sequence 200 may be calculated based on a comparison of the trust point B of the second stage 204 to the trust point F of the sixth stage 212. Likewise, the second trust parameter 504 may be calculated for the second sequence 300 based on a comparison of the trust point B' of the first stage 202 to the trust point F' of the fifth stage 210. Accordingly, like the first trust parameter 502, the evolution of the second trust parameter 504 may be determined by comparing the second trust parameter 504 of the first sequence 200 to the second trust parameter 504 the second sequence 300.

The third trust parameter 506 may be indicative of the user's beliefs regarding the intentions of the developers of the mobility platform. For example, the third trust parameter 506 may be used to determine if the user finds the developers of the mobility platform trustworthy and whether the developers take the concerns of users seriously. As discussed above, the third trust parameter 506 may be calculated by comparing one or more trust points of a sequence. By comparing the third trust parameter 506 calculated for the sequences, the evolution of the user's beliefs regarding the intentions of the developers may be determined as a function of order in which the mobility platforms are encountered.

The fourth trust parameter 508 may be indicative of the propensity of the user to trust the mobility platform. For example, the fourth trust parameter 508 may be used to determine whether the user believes that the user should take care when using the mobility platform or operating the corresponding motorized device. The fourth trust parameter 508 may be used to determine whether the user is prone to trusting the mobility platform rather than mistrusting it. The fifth trust parameter 510 may be indicative of the user's trust in automation generally. For example, the fifth trust parameter 510 may be used to determine the trust in the corresponding motorized device. Like the other trust parameters, the fourth trust parameter 508 and the fifth trust parameter 510 may be calculated by comparing one or more trust points of a sequence.

The trust parameters 502-510 may populate corresponding data points to a machine learning dataset 158 that may be accessed by the RNN 148. The machine learning dataset 158 may include first mobility data. The stored data points of the machine learning dataset 158 may be analyzed based on the trust model 400 to calculate an estimated trust score 512 that is specific to the user. The estimated trust score 512 may be used to modify operation of the second mobility platform 104 based on the estimated trust score 512. Modifying the operation of the second mobility platform 104 include increasing or decreasing automation aids provided to the user by the second mobility platform 104.

The automation aids may be provided by one or more systems, sensors, and/or components of the second motorized device 110. The automation aids may include one or more of changing a driving style of the second mobility platform 104, adding or removing a tutorial from the second mobility platform 104, and/or increasing or decreasing a level of automation transparency, among others. The level of automation transparency that is provided to the user of the second motorized device 110 may include one or more augmented reality cues that may be presented to the user of the second motorized device 110 during autonomous or semi-autonomous operation of the second motorized device 110.

In one embodiment, the level of automation transparency may be indicated as low or high and increased or decreased accordingly. For example, if a number of augmented reality cues is lower than a threshold number and/or may not provide many specific details associated with autonomously or semi-autonomously control of the operation of the second motorized device 110, the level of automation transparency may be indicated as low. Alternatively, if a number of augmented reality cues is equal to or higher than a threshold number and/or may provide many specific details associated with autonomously or semi-autonomously control of the operation of the second motorized device 110, the level of automation transparency may be indicated as high.

Referring again to FIG. 1, the components of the first mobility platform 102, the second mobility platform 104, and the trust model application 106 will now be discussed. The components of first mobility platform 102 may be operably controlled by the ECU 112. In one or more embodiments, the ECU 112 may include a respective microprocessor, one or more application-specific integrated circuit(s) (ASIC), or other similar devices. The ECU 112 may also include respective internal processing memory, an interface circuit, and bus lines for transferring data, sending commands, and communicating with the plurality of components of the first mobility platform 102.

The ECU 112 may also include a respective communication device (not shown) for sending data internally to components of the first mobility platform 102 and communicating with externally hosted computing systems (e.g., external to the first mobility platform 102). In one embodiment, the ECU 112 may be operably connected to a head unit (not shown) of the first motorized device 108 that may include and/or may be operably connected to one or more display devices 116 and one or more audio devices (not shown). In one embodiment, the display device(s) 116 may be located within the center of the dashboard of the first motorized device 108 or any other location within the first motorized device 108.

In some configurations, the display device(s) 116 may be configured as a meter display (not shown) that is disposed behind a steering wheel (not shown) of the first motorized device 108. The meter display may include a dashboard display or an instrument cluster display. In additional embodiments, the display device(s) 116 may be alternatively or additionally configured as head up display (HUD) (not shown) that may be projected/disposed upon a windshield (not shown) of the first motorized device 108.

In one embodiment, the trust model application 106 may be configured to utilize the display device(s) 116 to provide one or more of the levels of automation transparency that are provided in the form of one or more augmented reality cues that may be presented to user of the first motorized device 108 through the display device(s) 116. In some configurations, the trust model application 106 may also be configured to utilize the audio device(s) to provide audio-based alerts that may be heard within the first motorized device 108 to provide one or more levels of automation transparency.

In an exemplary embodiment, the trust model application 106 may utilize data included within the machine learning dataset 158 to process a control policy to thereby operably control the display device(s) 116 to present the one or more augmented reality cues to provide one or more levels of automation transparency that may be presented to the user of the first motorized device 108 during autonomous or semi-autonomous operation of the first motorized device 108. The trust model application 106 may be configured to continually vary automation transparency and the specificity of details associated with automated control of the first motorized device 108 that may be provided through the display device(s) 116 based on the control policy.

In one embodiment, the ECU 112 may be configured to communicate with the vehicle autonomous controller 114 of the first motorized device 108 to execute autonomous driving commands to operate the first motorized device 108 to autonomously control one or more driving functions of the first motorized device 108. The one or more driving functions may include, but may not be limited to steering, braking, accelerating, merging, turning, coasting, and the like. In one embodiment, the trust model application 106 may utilize data included within the machine learning dataset 158 to communicate with the vehicle autonomous controller 114 to control the level of automation transparency and/or an autonomous operation of one or more driving functions of the first motorized device 108.

The trust model application 106 may be configured to communicate with the vehicle autonomous controller 114 to provide a level of automation control of one or more systems of the first motorized device 108 in a particular traffic scenario in which the first motorized device 108 is being autonomously or semi-autonomously operated to autonomously control one or more driving functions of the first motorized device 108. In some configurations, the trust model application 106 may be configured to communicate with the vehicle autonomous controller 114 to provide a level of automation transparency that may be based on the estimated trust score 512. The trust model application 106 may be configured to control the display device(s) 116 to provide respective levels of automation aids of one or more driving functions of the first motorized device 108. As an illustrative example, the trust model application 106 may communicate with the vehicle autonomous controller 114 to provide a particular level of automated braking, a particular alert, and/or to provide a particular level of automation transparency in the form of augmented reality cues through the display device(s) 116 with respect to the automated braking of the first motorized device 108.

In one or more embodiments, the ECU 112 may be operably connected to dynamic sensors 120 of the first motorized device 108. The dynamic sensors 120 may be configured to output sensed dynamic data associated with particular traffic maneuvers of the first motorized device 108 as it is being manually operation, semi-autonomously operated, and/or autonomously operated. In one configuration, the dynamic sensors 120 may be configured to receive inputs from one or more vehicle systems, sub-systems, control systems, and the like. The dynamic sensors 120 may be configured to provide vehicle dynamic data to the ECU 112 to be utilized for one or more vehicle systems, sub-systems, control systems, and the like.

The dynamic sensors 120 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, biological sensors, and the like (individual sensors not shown). In one or more embodiments, the dynamic sensors 120 may output sensed dynamic data that may include real-time data associated with particular traffic maneuvers of the first motorized device 108 as its being operated.

In one embodiment, the sensor system 118 may be configured to analyze the dynamic data associated with particular traffic maneuvers of the first motorized device 108 as its being operated over a predetermined period of time to determine the machine learning dataset 158. In some embodiments, the sensor system 118 may analyze the dynamic data output by the dynamic sensors at one or more periods of time to determine the machine learning dataset 158 associated with the user of the first motorized device 108. In some configurations, the sensor system 118 may analyze the machine learning dataset 158 in addition to image data provided by a camera system 122 of the first motorized device 108 and LiDAR data provided by a laser system 124 of the first motorized device 108.

In an exemplary embodiment, the ECU 112 may additionally be configured to operably control the camera system 122 of the first motorized device 108. The camera system 122 may include one or more cameras (not shown) that are positioned at one or more internal portions of an interior cabin of the first motorized device 108 to capture images of the user of the first motorized device 108. The camera system 122 may also include one or more cameras that are positioned at one or more external portions of the first motorized device 108 to capture images of the driving scene of the first motorized device 108 (e.g., a predetermined area located around (front/side/behind) the first motorized device 108.

In particular, the one or more cameras that are positioned at one or more internal portions of an interior cabin of the first motorized device 108 may be configured to capture images of the user's eyes to be analyzed to determine the user's eye movements within the first motorized device 108. The one or more cameras that are positioned at one or more internal portions of an interior cabin of the first motorized device 108 may be also be configured to capture images of the user's body to be analyzed to determine the user's body movements.

In an exemplary embodiment, the one or more cameras may be configured to capture images of the user's eyes and send respective image data to the trust model application 106. The trust model application 106 may be configured to analyze the image data associated with one or more images captured for a predetermined period of time to analyze one or more gaze cues to recognize the user's eye gaze cues over a predetermined period of time.

In an exemplary embodiment, the trust model application 106 may continuously analyze the gaze cues to recognize the user's eye gaze directions. Specifically, the trust model application 106 may detect the location of the user's eyes from the image(s) sent by camera system 122 and may specifically evaluate specific areas of the eyes (e.g., iris, pupil, corners of the eye, etc.). The trust model application 106 may utilize virtually any method to perform gaze detection and translate the gaze cues to determine the user's eye gaze directions. In one embodiment, the trust model application 106 may analyze the eye gaze directions of the user based off of a linear model that may consider the evaluation of the specific areas of the eyes of the user of the first motorized device 108.

The trust model application 106 may also analyze the body movements of the user with respect to the movement of the user's arms, hands, legs, feet, and torso. The trust model application 106 may utilize virtually any method to determine the body movements of the user. For example, the trust model application 106 may receive health data about a user from biological sensor(s) of the dynamic sensors 120. In one embodiment, the trust model application 106 may analyze the user's body to determine movements based off of a linear model that may consider the evaluation of the specific areas of the body of the user of the first motorized device 108 as the first motorized device 108 is being operated. For example, the trust model application 106 may discretize the user's body movements at any time belonging to one of a plurality of values pertaining to one or more components of the first motorized device 108.

The biological sensors of the dynamic sensors 120 may also receive health data including a body temperature, a pulse, a pulse rate or heart rate, a respiration rate, perspiration rate, a blood pressure, eye movement, body movement, head movement, carbon dioxide output, or other biometric or functional aspects of a user's mobility. In one embodiment, the trust model application 106 may determine that a user of a mobility device is experiencing a stroke, heart attack, stress, sleepiness, drowsiness, inattentiveness, etc. based on droopy eyelids, heart rate, absence or lack of steering input over a predetermined period of time.

In an exemplary embodiment, the laser system 124 may include one or more LiDAR transceivers (not shown). The one or more LiDAR transceivers of the laser system 124 may be disposed at respective external front, rear, and/or side portions of the first motorized device 108 including but not limited to different portions of bumpers, body panels, fenders, lighting units, windows and/or windshield. The one or more respective LiDAR transceivers may include one or more planar sweep lasers that may be configured to oscillate and emit one or more laser beams of ultraviolet, visible, or near infrared light toward the surrounding environment of the first motorized device 108. The laser system 124 may be configured to receive one or more reflected laser waves based on one or more laser beams emitted by the LiDAR transceivers. The one or more reflected laser waves may be reflected off of one or more objects (e.g., static and/or dynamic objects) that may be located within the driving scene of the first motorized device 108. In one configuration, the laser system 124 may be configured to output LiDAR data associated to one or more reflected laser waves to the trust model application 106.

In one or more embodiments, the trust model application 106 may be configured to analyze the image data output by the camera system 122 and/or the LiDAR data output by the laser system 124 to determine the traffic scenario in which the first motorized device 108 is being operated based on the location of one or more dynamic objects that may be located within the driving scene of the first motorized device 108, one or more static objects that may be located within the driving scene of the first motorized device 108, one or more roads/pathways (e.g., that may include guardrails, curbs, barrier, etc.) that may be located within the driving scene of the first motorized device 108, one or more lanes that may be located upon one or more roads/pathways that may be located within the driving scene of the first motorized device 108, and the like. As discussed below, the trust model application 106 may analyze the image data and/or the LiDAR data to identify the machine learning dataset 158 with respect to the autonomous operation or the semi-autonomous operation of the first motorized device 108 during particular traffic scenarios.

In one or more embodiments, the ECU 112 of the first motorized device 108 may be operably connected to a communication unit (not shown) that may be operably controlled by the ECU 112. The communication unit may be part of a telematics control unit (not shown) of the first motorized device 108 and may be operably connected to one or more transceivers (not shown) of the first motorized device 108. The communication unit 144 may be configured to communicate through an internet cloud 140 through one or more wireless communication signals that may include, but may not be limited to Bluetooth® signals, Wi-Fi signals, ZigBee signals, Wi-Max signals, and the like. The communication unit 144 may be configured to communicate through the internet cloud 140 to send and receive communication signals to and from the first mobility platform 102 and the second mobility platform 104.

The components of the second mobility platform 104 are similar to the components of the first mobility platform 102 and operate in a similar manner, but with respect to the second motorized device 110. For example, the components of the second mobility platform 104 may be operably controlled by the ECU 126. Like the ECU 112, the ECU 126 may include a respective microprocessor, one or more ASICs, or other similar devices. In one embodiment, the ECU 126 may be configured to communicate with the vehicle autonomous controller 128 of the second motorized device 110 to execute autonomous driving commands to operate the second motorized device 110 to autonomously control one or more driving functions of the second motorized device 110. The vehicle autonomous controller 128 may provide a particular level of automation transparency in the form of augmented reality cues through the display device(s) 130 with respect to the second motorized device 110. In this manner, the ECU 126, the vehicle autonomous controller 128, and the display device 130 operate in a similar manner as described above with respect to the ECU 112, the vehicle autonomous controller 114, and the display device 116 of the first mobility platform 102.

The second mobility platform 104 may include a sensor system 132 that includes one or more sensors like those described with respect to the sensor system 118 of the first mobility platform 102. In one embodiment, the dynamic sensors 134 may be configured to receive inputs or provide outputs from one or more vehicle systems, sub-systems, control systems, etc. The camera system 136 may include one or more cameras that are positioned at one or more internal portions of an interior cabin or the exterior of the second motorized device 110. Likewise, the laser system 138 may include one or more LiDAR transceivers (not shown). In this manner, the sensor system 132, the dynamic sensors 134, the camera system 136, and the laser system 138 operate in a similar manner as described above with respect to the sensor system 118, the dynamic sensors 120, the camera system 122, and the laser system 124 of the first mobility platform 102.

In one embodiment, the trust model application 106 may be configured to utilize the RNN 148 to execute a machine learning/deep learning probabilistic framework to output the trust model 400 to determine cross mobility platform trust. The RNN 148 may be configured to train models based on trust parameters 502-510 calculated based on the machine learning dataset 158 that pertain to the stages 202-220, trust points, and/or crowdsourced survey data that may be provided from surveys conducted by participants. In one configuration, the RNN 148 may be configured to train the trust model 400. Accordingly, the trust model 400 may be provided and the RNN 148 may be utilized by the trust model application 106 to calculate the estimated trust score 512 and determine modifications to automation aids in which the second motorized device 110 is (currently) being autonomously operated or semi-autonomously operated.

The processor 142 may be operably connected to a memory 146. The memory 146 may store one or more operating systems, applications, associated operating system data, application data, executable data, and the like. In one or more embodiments, the machine learning dataset 158 may be configured as a dataset that includes one or more fields that are populated with data points that are associated with the automation variables, scene variables, and pre-trained crowdsourced survey data, stages 202-210, trust points, and/or trust parameters 502-510. The one or more fields may also be populated with traffic scenario data that pertains to the traffic scenario of the second motorized device 110.

The general functionality of the trust model application 106 will now be discussed. In an exemplary embodiment, the trust model application 106 may be stored on the memory 146 and executed by the processor 142 of an external server (not shown). The processor 142 of trust model application 106 may include a data processing module 150, a swap module 152, a score module 154, and a vehicle control module 156. However, it is to be appreciated that the trust model application 106 may include one or more additional modules and/or sub-modules that are included in addition to the modules 150-156. In another embodiment, the trust model application 106 may be stored on a storage unit (not shown) of the first motorized device 108 and/or the second motorized device 110 and may be executed by the ECU 112 and/or the ECU 126, respectively. Methods and examples describing process steps that are executed by the modules 150-156 of the trust model application 106 will now be described in more detail.

II. Methods for Determining Trust Across Mobility Platforms

In an exemplary embodiment, the trust model application 106 may execute the method 600 before and/or during a semi-autonomous operating mode or an autonomous operating mode of a motorized device. For clarity, an embodiment will be discussed in which the first mobility platform 102 is encountered by a user at a first time, and the second mobility platform 104 is either to be encountered or is encountered at a second time after the first time. However, it will be understood that the user could encounter mobility platforms in any sequence, as described above. Here, the user has encountered the first mobility platform 102 in the past at the first time, and plans to encounter the second mobility platform 104 at a second time in the present or the future.

As will be described in detail below, automation aids for the second mobility platform 104 are determined based on an estimated trust score 512 calculated specifically for the user based on the trust model 400. The trust model 400 is trained in the manner described above based on the calculated trust parameters 502-510 using the trust points at the various stages 202-220.

Figure 6:
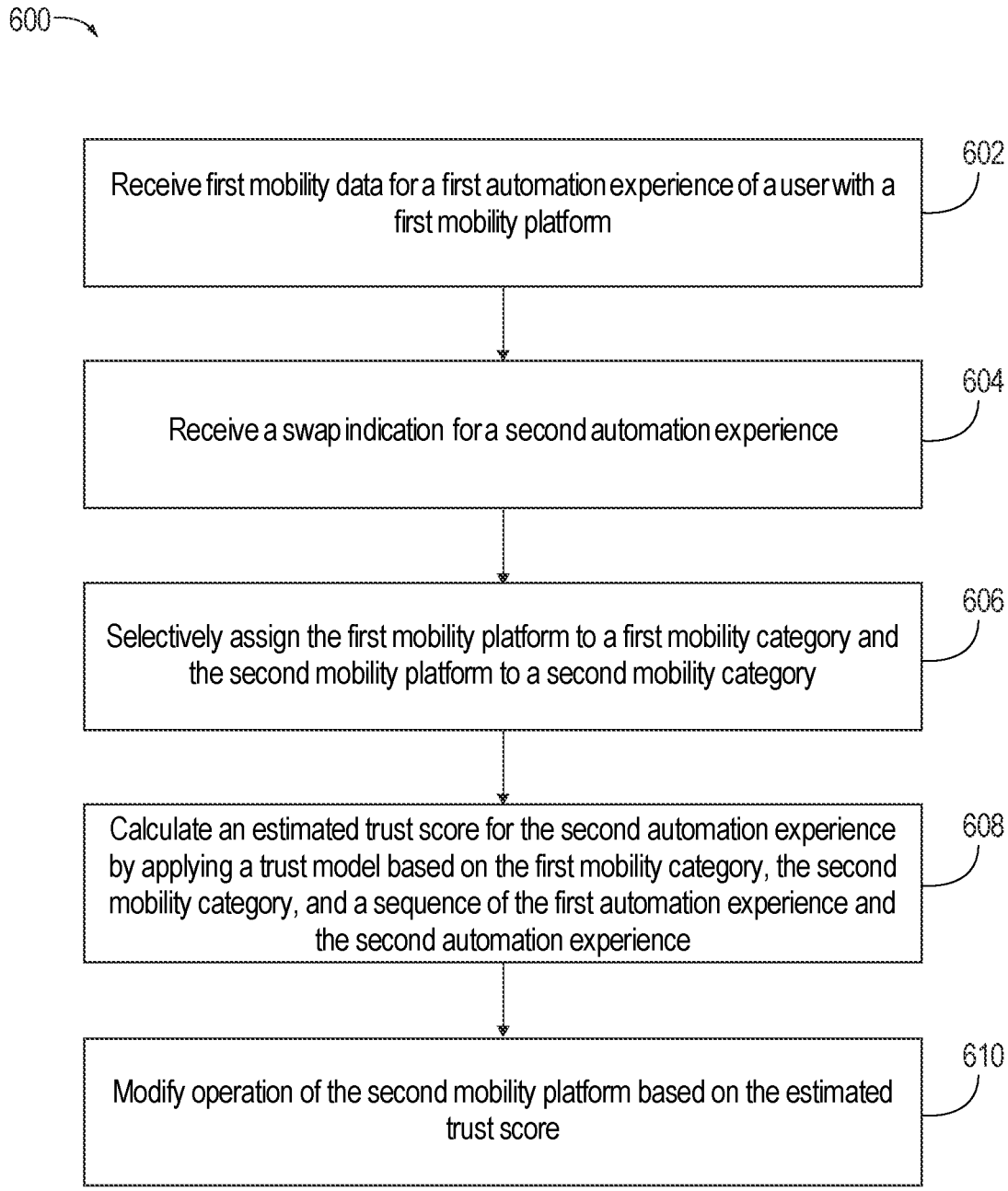
FIG. 6 is a process flow diagram of a method for determining trust across mobility platforms according to an exemplary embodiment.

Referring now to FIG. 6, a method 600 for determining trust across mobility platforms will now be described according to an exemplary embodiment. FIG. 6 will also be described with reference to FIGS. 1-5, 7, and 8. For simplicity, the method 600 will be described as a sequence of blocks, but it is understood that the blocks of the method 600 may be organized into different architectures, elements, stages, and/or processes.

At block 602, the method 600 includes the data processing module 150 receiving first mobility data for a first automation experience of a user with a first mobility platform 102. The mobility categories may be based on features of the motorized devices such as number of wheels, size of the engine of the motorized device, enclosed or open motor, etc. The mobility categories may be based on the manner the motorized device is operated. For example, the mobility categories may include watercraft, flying vehicles, space vehicles, off-road vehicles, sidewalk vehicles, roadway vehicles, etc. The mobility categories may also be based on the experience of the user. For example, whether the user is standing, recumbent, reclining, etc. during operation of the first motorized device 108.

The first mobility data may include the dynamic data associated with the operation of the first motorized device 108. In an exemplary embodiment, the data processing module 150 may be configured to communicate with the dynamic sensors 120 of the first motorized device 108 to determine when the first motorized device 108 is being semi-autonomously operated and/or autonomously operated based on electronic commands that are sent to one or more components of the first motorized device 108 from the vehicle autonomous controller 114. Upon determining that the first motorized device 108 is being semi-autonomously or autonomously operated, the data processing module 150 may be configured to analyze the dynamic data associated with particular traffic maneuvers of the first motorized device 108 over a predetermined period of time to determine if the user may take over control of the first motorized device 108 at particular time stamps when the first motorized device 108 is being autonomously or semi-autonomously operated. The dynamic data may also be analyzed to determine what type of take-over control the user of the first motorized device 108 is completing with respect to the autonomous or semi-autonomous operation of the first motorized device 108.

The first mobility data may also include information about the user. For example, the first mobility data may include health data. In one embodiment, the first mobility data may include determining eye gaze directions and body movements of the user of the first motorized device 108. In an exemplary embodiment, upon receiving the image data associated with images that are captured of the user's eyes and/or portions of the user's body as the first motorized device 108 is being semi-autonomously or autonomously operated, the data processing module 150 may be configured to analyze the image data associated with one or more images captured for a predetermined period of time to analyze one or more gaze cues and body movements that may indicate when the trust level of the user during semi-autonomous and/or autonomous operation of the first motorized device 108.

In particular, the data processing module 150 may continuously analyze eye gaze cues to recognize the user's eye gaze directions for a predetermined period of time. The data processing module 150 may thereby detect the location of the user's eyes from the image(s) sent by camera system 122 and may specifically evaluate specific areas of the eyes to determine the user's eye gaze directions. The data processing module 150 may utilize virtually any method to translate the gaze cues to determine the user's eye gaze directions. In one embodiment, the data processing module 150 may analyze the user's eye gaze directions based off of a linear model that may consider the evaluation of the specific areas of the eyes.

The data processing module 150 may thereby determine eye gaze directions of the user of the first motorized device 108 based on the gaze (viewpoint) of the user and may output respective data. For example, the data processing module 150 may discretize the user's gaze direction at any time belonging to one of a plurality of values pertaining to the user's eye gaze direction that may include, but may not be limited to, the user's eye gaze direction toward the road on which the first motorized device 108 is traveling, the user's eye gaze direction toward a dynamic object that may be located within the driving scene of the first motorized device 108, the user's eye gaze direction toward a static object that may be located within the driving scene of the first motorized device 108, the user's eye gaze direction towards road markings, road signage, traffic infrastructure, and the like that may be located within the driving scene, and the user's eye gaze direction towards portions of the interior of the first motorized device 108.

The data processing module 150 may also analyze body movements of the user with respect to the movement of the user's arms, hands, legs, feet, and torso. The data processing module 150 may utilize virtually any method to determine the body movements of the user. In one embodiment, the data processing module 150 may analyze the user's body to determine movements based off of a linear model that may consider the evaluation of the specific areas of the body user of the first motorized device 108 as the first motorized device 108 is being operated. For example, the data processing module 150 may discretize the user's body movements at any time belonging to one of a plurality of values pertaining to one or more components of the first motorized device 108, including, but not limited to, the steering wheel, the accelerator, the brake pedal, the gear shifter, one or more input switches that may be inputted to enable or disable autonomous or semi-autonomous operation of the first motorized device 108, one or more input switches that may be inputted to enable or disable one or more vehicle systems (e.g., tracking control system), and the like.

The first mobility data may also include information about the environment of the first motorized device 108 during the first automation experience. For example, the first mobility data may include image data associated with the driving scene of the first motorized device 108. In one embodiment, the data processing module 150 may be configured to communicate with the camera system 122 of the first motorized device 108 to receive image data associated with the driving scene of the first motorized device 108. As discussed above, the image data associated with the driving scene of the first motorized device 108 may be captured by one or more external cameras of the camera system 122 of the first motorized device 108.

In an exemplary embodiment, upon receiving the image data, the data processing module 150 may be configured to analyze the image data that pertains to the driving scene of the first motorized device 108 using image logic (e.g., computer-executed instructions stored upon the storage unit (not shown) and/or the memory to determine configuration of the surrounding environment of the first motorized device 108. The driving scene may include one or more dynamic objects that may be located within the surrounding environment of the first motorized device 108, one or more static objects that may be located within the surrounding environment of the first motorized device 108, one or more roads/pathways that may be located within the surrounding environment of the first motorized device 108, one or more lanes that may be located upon one or more roads/pathways that may be located within the surrounding environment of the first motorized device 108, and the like.

In one configuration, the data processing module 150 may evaluate the image data using the image logic to classify dynamic objects that may be located within the driving scene. In particular, the data processing module 150 may evaluate the image logic to classify the dynamic objects that are detected to be located within the driving scene as vehicles or pedestrians.

In addition to image data, the first mobility data may include receiving LiDAR data associated with the driving scene of the first motorized device 108. As discussed above, the laser system 124 may be configured to receive one or more reflected laser waves based on one or more laser beams emitted by the LiDAR transceivers of the laser system 124. The one or more reflected laser waves may be reflected off of one or more objects (e.g., static and/or dynamic objects) that may be located within the driving scene of the first motorized device 108.

In one configuration, the laser system 124 may be configured to output LiDAR data associated to one or more reflected laser waves to the data processing module 150. The data processing module 150 may be configured to analyze the LiDAR data that pertains to the driving scene of the first motorized device 108 to determine the traffic scenario in which the first motorized device 108 is being operated based on the location of one or more dynamic objects that may be located within the driving scene of the first motorized device 108, one or more static objects that may be located within the driving scene of the first motorized device 108, one or more roads/pathways (e.g., that may include guardrails) that may be located within the driving scene of the first motorized device 108, one or more lanes that may be located upon one or more roads/pathways that may be located within the driving scene of the first motorized device 108, and the like.

In one configuration, the data processing module 150 may evaluate the LiDAR data using the LiDAR logic to classify dynamic objects that may be located within the driving scene. In particular, the data processing module 150 may evaluate the LiDAR logic to classify the dynamic objects that are detected to be located within the driving scene as vehicles or pedestrians.

The first mobility data may include trip log data for a number of trips encountered in various mobility devices and/or one more mobility platforms. For example, the trip log data may include the location of an origin and/or destination, type of location, amenities of the origin and the destination, the first start time, the first end time, the second start time, the second end time, route information, mileage, the travel time period, duration, amenities at the location, etc. The amenities at the location may include covered parking, and access to a charge station, among others. While a single destination is discussed, the first motorized device 108 may take numerous trips to multiple destinations. Accordingly, the trip log data may include data about numerous trips over long periods of time (e.g., hours, days, months, years, etc.). In this manner, the trip log may include information about previous automation experiences. The trip log data may be stored and utilized by the trust model application 106.

The trip log data may be stored as historical data associated with a user profile includes information about the user. For example, the user profile may include demographic information, user preferences, medical information, physiological baselines, biological sensor data, and a preferred interaction style of the user with mobility devices, including the first motorized device 108.

At block 604, the method 600 includes the swap module 152 receiving a swap indication 406 for a second automation experience of the user with a second mobility platform 104 after the first automation experience. The swap indication 406 may be a request for the second motorized device 110. The request may be identified as a request received from the user at the swap module 152. For example, the user may generate the request using a mobile device (not shown). Alternatively, the swap indication 406 may be identified when the request is generated. In another embodiment, the swap indication 406 may be received in response to predictive data extracted from other sources such as the electronic or online calendar or datebook, historical use patterns, third party management, among others.

At block 606, the method 600 includes the score module 154 selectively assigning the first mobility platform to a first mobility category and the second mobility platform to a second mobility category different than the first mobility category. The mobility categories of the plurality of mobility categories are different ways to define the mobility devices, automation experiences, user experience, etc. The mobility categories may be user defined, structure-specific, crowdsourced, or set as a default. A mobility category may be assigned based on a predetermined or threshold number of parameters corresponding to the mobility category being satisfied.

In one embodiment, mobility platforms may be categorized based on the type of motorized device. For example, a first mobility category may be vehicular and include mobility platforms for automation of automobiles and a second mobility category may be for electronic scooters. The mobility category based on the type of motorized device may be based on mobility parameters. Mobility parameters may indicate features of the mobility devices such as number of wheels, number of axles, energy source, engine type, etc.

In another embodiment, the mobility platforms may be categorized based on the automation experience. The automation experience may be determined based on a number of automation parameters that describe the automation experience. For example, the automation parameters may include aspects of the automation, object detection, mobility presentation (e.g., on displays device like the display device 116 or the display device 130, heads-up-display (HUD), audio output, etc.), sensor arrangement, and automation transparency, among others.

The automation experience may be based on autonomy levels. For example, a first level of autonomy may include an automated system that issues warnings and may momentarily intervene but has no sustained vehicle control. In a second level of autonomy, the driver and the automated system may share control of the vehicle. In a third level of autonomy, the automated system takes full control of the vehicle (accelerating, braking, and steering), but the driver must monitor the driving and be prepared to intervene immediately at any time if the automated system fails to respond properly. In a fourth level of autonomy, driver attention is not required, for example, the driver may go to sleep or leave the driver's seat. If the mobility categories are based on the automation experience, then the mobility categories may correspond to the autonomy levels. For example, a first mobility category may correspond to the first autonomy level, the second mobility category may correspond to a second autonomy level, the third mobility category may correspond to a third autonomy level, and so on.

In yet another embodiment, the mobility platforms may be categorized based on the user experience, in response to a number of user parameters being satisfied, such as entry method to the corresponding motorized device, number of passenger, user response, etc. As another example, the categories corresponding to the user experience may further be based on user parameters including the expressions, moods, emotions, etc. of the user. The user parameters may also include the sounds a user is making while encountering the second mobility platform 104. For example, the user parameters may be associated with features extracted via voice recognition such as identification as spoken language, pitch, emotion, etc. In some embodiments, user parameters may include category conditions indicative of the physiological state of the user received by biological sensors. For example, a first mobility category may be associated with a baseline physiological state of the user based on a user profile. The second mobility category may include an elevated heartrate as compared to a baseline, pitch of voice based on age and gender of the identified human, presence of sweat, respiratory rate exceeding a respiratory baseline, etc.

One or more of the parameters may not be categorized. Continuing the example from above, the mobility platform may not be categorized into a mobility category. Alternatively, the mobility categories may include a catch-all mobility category for mobility platforms that do not conform to other mobility categories. In this manner, if the motorized device does not satisfy any mobility categories, the mobility platform may be assigned to the catch-all mobility category.

At block 608, the method 600 includes the score module 154 calculating an estimated trust score 512 for the second automation experience by applying a trust model 400 based on the first mobility category, the second mobility category, and a sequence of the first automation experience and the second automation experience. In the manner, the score module 154 may leverage the RNN 148 to execute a machine learning/deep learning probabilistic framework to output the trust model 400 to determine cross mobility platform trust. As discussed above, the RNN 148 may be configured to train models based on trust parameters 502-510 calculated based on the machine learning dataset 158 that pertain to the stages 202-220, trust points, and/or crowdsourced survey data that may be provided from surveys conducted by participants. Accordingly, based on the automation experience of the user with the first mobility platform 102 (via the firs mobility category), the second mobility platform 104 the user is moving to and/or using, and the sequence of the first mobility platform 102 to the second mobility platform 104, may be assessed by the score module 154 based on the trust model to calculate the estimated trust score.

In some embodiments, the estimated trust score may be updated based on vehicle sensor data received in real-time from the second mobility platform 104. For example, the estimated trust score may be updated based on biological sensor data about the user received in real-time from the second mobility platform 104. If the biological sensor data indicates that the user is suffering a medical crisis or stress, the estimated trust score may be lowered to correspond to the biological response of the user.

At block 610, the method 600 includes the vehicle control module 156 modifying operation of the second mobility platform 104 based on the estimated trust score 512. In one embodiment, modifying the operation of the second mobility platform 104 may include providing a level of control to at least one system of the second motorized device 110 and/or to control a level of automation transparency. The automation transparency may be provided in the form of one or more augmented reality cues that may be presented to the user of the second motorized device 110 during an autonomous operation or a semi-autonomous operation of the second motorized device 110. In particular, the one or more augmented reality cues may indicate information that may be associated with particular autonomous or semi-autonomous functions (e.g., braking, steering, accelerating, etc.) that may be occurring during an autonomous operation or a semi-autonomous operation of the second motorized device 110.

In an exemplary embodiment, the trust model application 106 may utilize the first mobility data (e.g., pre-trained data, previously stored data) included within the machine learning dataset 158 to process a control policy to thereby operably control the display device(s) 130 of the second motorized device 110 to present the one or more augmented reality cues to provide one or more levels of automation transparency that may be presented to the user of the second motorized device 110 during autonomous or semi-autonomous operation of the second motorized device 110. The augmented reality cues may indicate information that may be associated with particular autonomous or semi-autonomous functions that may be occurring during the particular traffic scenario.

In one embodiment, the vehicle control module 156 may determine the level of automation transparency based on a number of augmented reality cues and a specificity of details associated with automated control of the second motorized device 110 that is presented to the user through the display device(s) 130 as the second motorized device 110 is being autonomously or semi-autonomously operated during the particular traffic scenario. In one embodiment, the level of automation transparency may be indicated as low or high based on a comparison to a threshold number of augmented reality cues and the specificity of details associated with the augmented reality cues with respect to the autonomous operation and/or semi-autonomous operation of the second motorized device 110.

Figure 7:
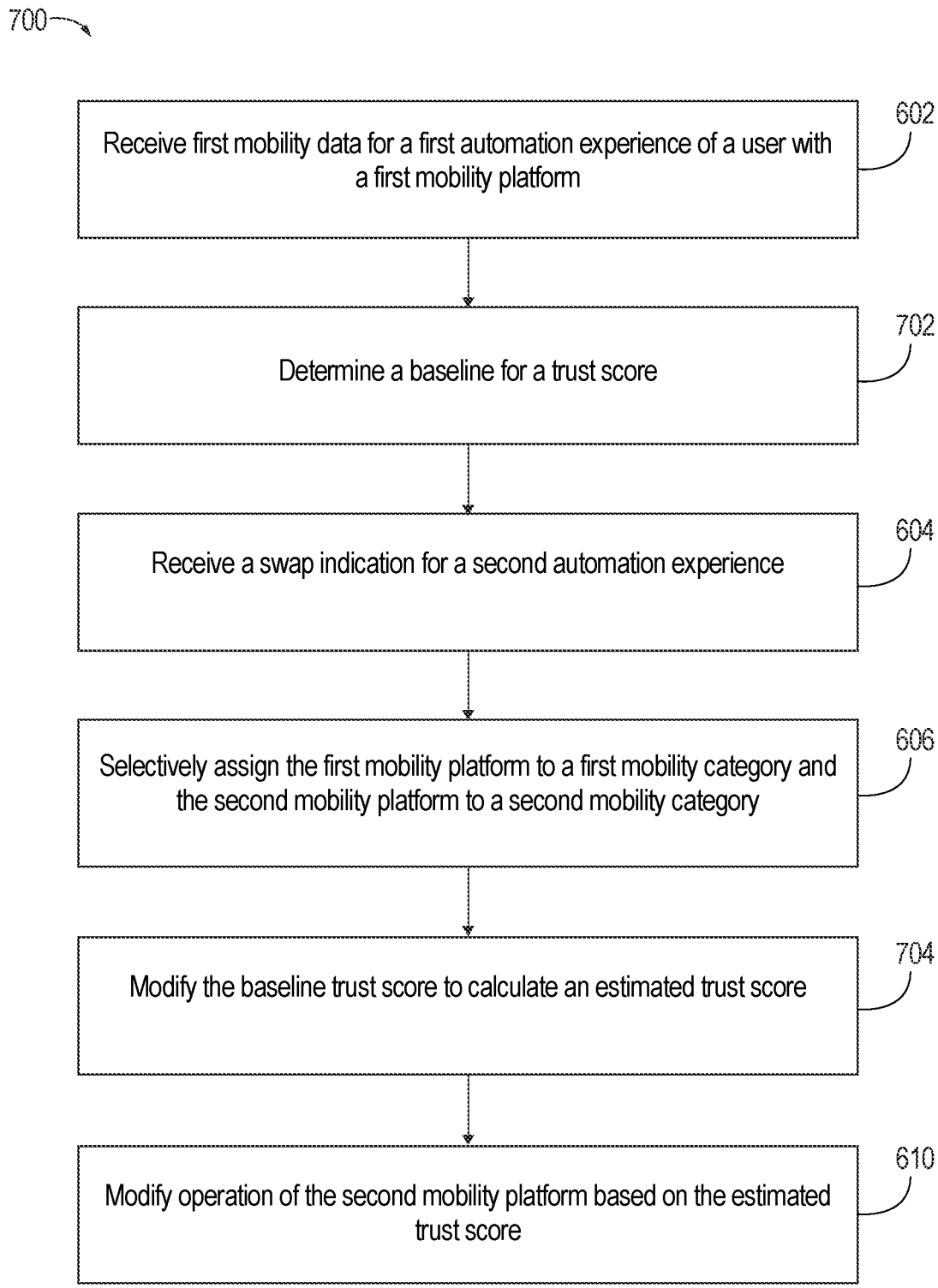
FIG. 7 is a process flow diagram of another method for determining trust across mobility platforms according to an exemplary embodiment.

Referring now to FIG. 7, a method 700 for determining trust across mobility platforms will now be described according to an exemplary embodiment. FIG. 6 will also be described with reference to FIGS. 1-6 and 8. For simplicity, the method 600 will be described as a sequence of blocks, but it is understood that the blocks of the method 600 may be organized into different architectures, elements, stages, and/or processes. Some block of the method 700 are similar to those described above with respect to method 600, and are numbered accordingly.

At block 602, the method 700 includes the data processing module 150 receiving first mobility data for a first automation experience of a user with a first mobility platform 102.

At block 702, the method 700 includes the score module 154 determining a baseline for a trust score. The baseline trust score for the user may be based on a user profile of the user. The estimated trust score 512 may then calculated based on the baseline trust score and a bias value calculated based on the trust model 400, as will be described in greater detail below. The bias value increases the estimated trust score from the baseline trust score when the first mobility category includes a vehicle as a type of motorized device. The baseline trust score may be based on the automation experience of the user with the first mobility platform 102 (via the firs mobility category), the second mobility platform 104 the user is moving to and/or using, and the sequence of the first mobility platform 102 to the second mobility platform 104, may be assessed by the score module 154 based on the trust model to calculate the estimated trust score.

At block 604, the method 700 includes the swap module 152 receiving a swap indication 406 for a second automation experience of the user with a second mobility platform 104 after the first automation experience. At block 606, the method 700 includes the score module 154 selectively assigning the first mobility platform to a first mobility category and the second mobility platform to a second mobility category different than the first mobility category.

At block 704, the method 700 includes modifying the baseline trust score to calculate the estimated trust score. The estimated trust score 512 is calculated based on the baseline trust score and a bias value calculated based on the trust model 400. For example, the bias value may increase the estimated trust score 512 from the baseline trust score when the first mobility category includes a vehicle as a type of motorized device.

At block 610, the method 700 includes the vehicle control module 156 modifying operation of the second mobility platform 104 based on the estimated trust score 512.

Figure 8:
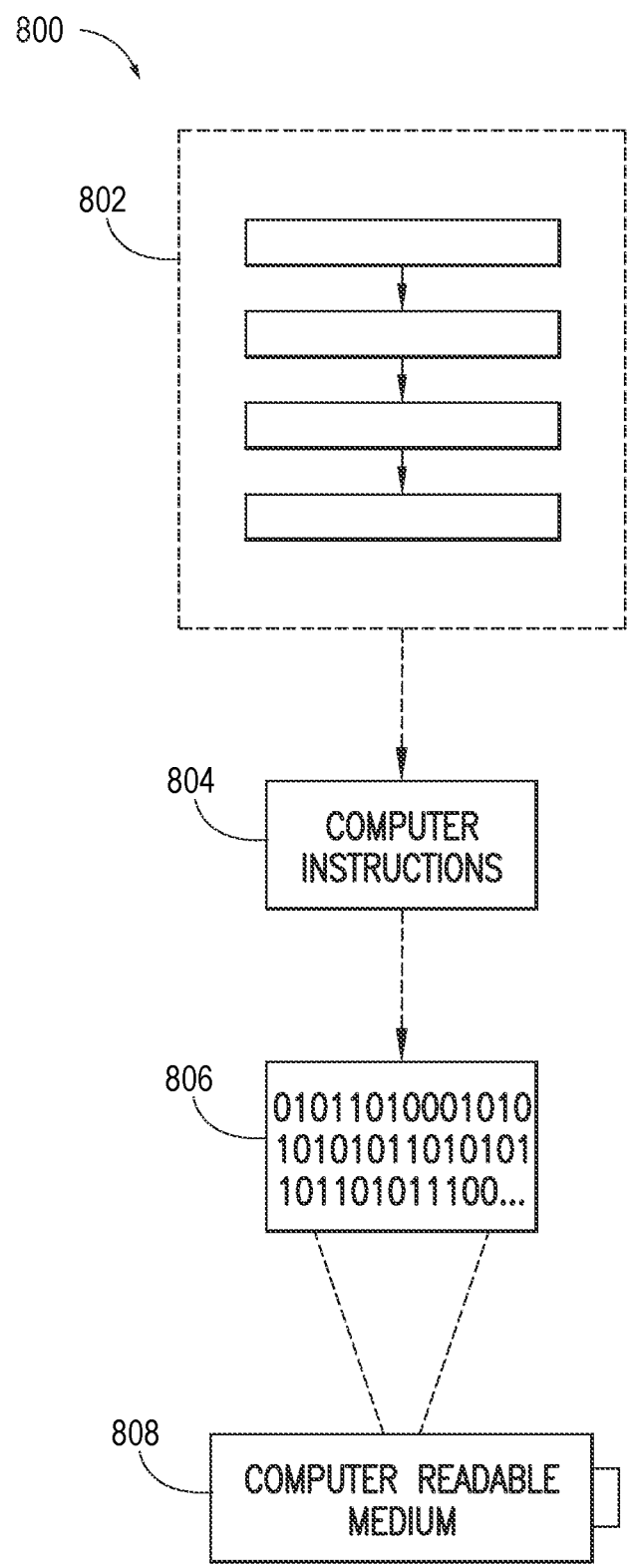
FIG. 8 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 8, wherein an implementation 800 includes a computer-readable medium 808, such as a CD-R, DVD-R, flash drive, a platter of a hard disk drive, etc., on which is encoded computer-readable data 806. This encoded computer-readable data 806, such as binary data including a plurality of zero's and one's as shown in 806, in turn includes a set of processor-executable computer instructions 804 configured to operate according to one or more of the principles set forth herein.

In this implementation 800, the processor-executable computer instructions 804 may be configured to perform a method 802, such as the computer-implemented trust calculation across mobility platforms method 600 of FIG. 6 and the computer-implemented trust calculation across mobility platforms method 700 of FIG. 7. In another aspect, the processor-executable computer instructions 804 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for determining trust across mobility platforms, the computer-implemented method comprising:
   receiving first mobility data for a first automation experience of a user with a first mobility platform;
   receiving a user interaction or system-generated swap indication for a second automation experience of the user with a second mobility platform after the first automation experience;
   selectively assigning the first mobility platform to a first mobility category and the second mobility platform to a second mobility category different than the first mobility category;
   calculating an estimated trust score for the second automation experience by applying a trust model that utilizes predefined mobility categories and incorporates the sequential order of the first automation experience and the second automation experience; and
   modifying operation of the second mobility platform based on the estimated trust score.

2. The computer-implemented method of claim 1, further comprising:
   determining a baseline trust score for the user based on a user profile of the user, wherein the estimated trust score is calculated based on the baseline trust score and a bias value calculated based on the trust model.

3. The computer-implemented method of claim 2, wherein the bias value increases the estimated trust score from the baseline trust score when the first mobility category includes a vehicle as a type of motorized device.

4. The computer-implemented method of claim 2, wherein the user profile includes a trip log of the user, and wherein the trip log includes a number of previous automation experiences.

5. The computer-implemented method of claim 1, further comprising:
   updating the estimated trust score based on biological sensor data about the user collected during the second automation experience and received in real-time from the second mobility platform.

6. The computer-implemented method of claim 1, further comprising:
   updating the estimated trust score based on vehicle sensor data received in real-time from the second mobility platform.

7. The computer-implemented method of claim 1, wherein the trust model is based on a plurality of trust parameters calculated at various stages of use of the first mobility platform and the second mobility platform.

8. The computer-implemented method of claim 1, wherein the first mobility category includes a first type of motorized device and the second mobility category includes a second type of motorized device different than the first type of motorized device, wherein the types are predefined categories used by the trust model.

9. The computer-implemented method of claim 1, wherein modifying the operation of the second mobility platform include increasing or decreasing automation aids provided to the user by the second mobility platform.

10. The computer-implemented method of claim 9, wherein the automation aids include one or more of changing a driving style of the second mobility platform, adding or removing a tutorial from the second mobility platform, and increasing or decreasing automation transparency.

11. A system for determining trust across mobility platforms, the system comprising:
    a memory storing instructions when executed by a processor cause the processor to:
    receive first mobility data for a first automation experience of a user with a first mobility platform;
    receive a user interaction or system-generated swap indication for a second automation experience of the user with a second mobility platform after the first automation experience;
    selectively assign the first mobility platform to a first mobility category and the second mobility platform to a second mobility category different than the first mobility category;
    calculate an estimated trust score for the second automation experience by applying a trust model that utilizes predefined mobility categories and incorporates the sequential order of the first automation experience and the second automation experience; and
    modify operation of the second mobility platform based on the estimated trust score.

12. The system of claim 11, wherein the instructions further cause the processor to:
determine a baseline trust score for the user based on a user profile of the user, wherein the estimated trust score is calculated based on the baseline trust score and a bias value calculated based on the trust model.

13. The system of claim 12, wherein the bias value increases the estimated trust score from the baseline trust score when the first mobility category includes a vehicle as a type of motorized device.

14. The system of claim 11, wherein the first mobility category includes a first type of motorized device and the second mobility category includes a second type of motorized device different than the first type of motorized device.

15. The system of claim 11, wherein modifying the operation of the second mobility platform include increasing or decreasing automation aids provided to the user by the second mobility platform.

16. A non-transitory computer readable storage medium storing instructions that when executed by a computer, which includes a processor perform a method, the method comprising:
receiving first mobility data for a first automation experience of a user with a first mobility platform;
receiving a user interaction or system-generated swap indication for a second automation experience of the user with a second mobility platform after the first automation experience;
selectively assigning the first mobility platform to a first mobility category and the second mobility platform to a second mobility category different than the first mobility category;
calculating an estimated trust score for the second automation experience by applying a trust model that utilizes predefined mobility categories and incorporates the sequential order of the first automation experience and the second automation experience; and
modifying operation of the second mobility platform based on the estimated trust score.

17. The non-transitory computer readable storage medium of claim 16, further comprising:
determining a baseline trust score for the user based on a user profile of the user, wherein the estimated trust score is calculated based on the baseline trust score and a bias value calculated based on the trust model.

18. A non-transitory computer readable storage medium storing instructions that when executed by a computer, which includes a processor perform a method, the metho comprising:
receiving first mobility data for a first automation experience of a user with a first mobility platform:
receiving a user interaction or system-generated swap indication for a second automation experience of the user with a second mobility platform after the first automation experience;
selectively assigning the first mobility platform to a first mobility category and the second mobility platform to a second mobility category different than the first mobility category;
calculating an estimated trust score for the second automation experience by applying a trust model that utilizes predefined mobility categories and incorporates the sequential order of the first automation experience and the second automation experience;
modifying operation of the second mobility platform based on the estimated trust score; and
determining a baseline trust score for the user based on a user profile of the user wherein the estimated trust score is calculated based on the baseline trust score and a bias value calculated based on the trust model,
wherein the bias value increases the estimated trust score from the baseline trust score when the first mobility category includes a vehicle as a type of motorized device.

19. The non-transitory computer readable storage medium of claim 16, wherein the first mobility category includes a first type of motorized device and the second mobility category includes a second type of motorized device different than the first type of motorized device.

20. The non-transitory computer readable storage medium of claim 16, wherein modifying the operation of the second mobility platform include increasing or decreasing automation aids provided to the user by the second mobility platform.

* * * * *